Feb. 28, 1967 S. A. MINERA 3,305,963
FISHING ROD CASTING DEVICE
Filed April 20, 1965
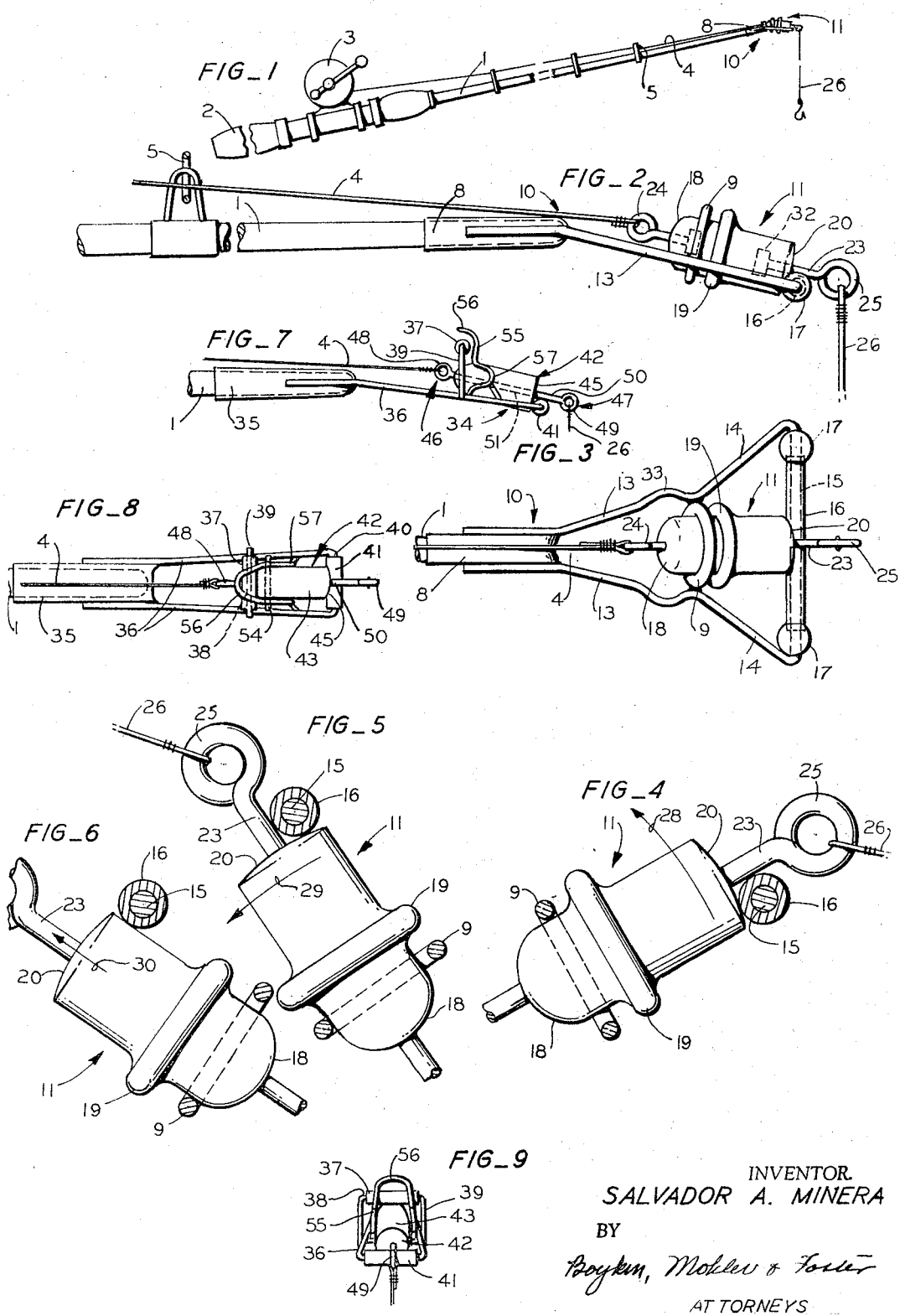
INVENTOR.
SALVADOR A. MINERA
BY
Boykin, Mohler & Foster
ATTORNEYS

3,305,963
FISHING ROD CASTING DEVICE
Salvador A. Minera, 1921 Taraval St.,
San Francisco, Calif. 94116
Filed Apr. 20, 1965, Ser. No. 449,428
7 Claims. (Cl. 43—24)

This invention relates to a fishing device and is similar to the invention shown and described in my copending application, Serial No. 412,425, filed November 19, 1964, and is for use with a rod and line for casting, and has for one of its objects the provision of improved means for insuring an automatic faster release of a fishing line in a casting operation than heretofore, and which release will occur only when the momentum of the fishing elements on the outer end of the line is substantially at its peak.

The present invention is particularly valuable where a spinning reel is used. Heretofore in the operation of casting, it is the usual practice for the fisherman to manually hold the line at a point adjacent to the spinning reel during the casting movement until he estimates the release should be to give the desired distance and accuracy. Attempts have been made to effect a release of the line through manual actuation of a mechanical release, but these efforts have the same objection as manual holding and release in that they are dependent upon whether or not the physical reaction of the fisherman is at the right time. If the exact timing is off, the cast is faulty.

With the present invention, the line may be cast with the desired force in any of the customary casting movements, and it will be automatically released when the casting movement ceases, and when the line is retrieved, by reeling it in, the outer end portion will be automatically stopped and held in the desired and proper position for re-casting. There is no interference with whatever normal and conventional combination of hooks, sinkers, floats, lures, bait, etc. the fisherman may attach to the line. The present device is between any of these elements or any combination thereof and the outer end of the rod, outwardly of the latter.

It may also be noted that the device used to accomplish the desired results comprises a single member that replaces the conventional guide ring on the outer end of the rod in the same manner as a tip-ring is replaced, and with no more difficulty, in cooperation with another member that is secured on the outer end of a line in substantially the same manner as a lure, sinker, float or the like.

In the present invention, provision is made for reducing the frictional resistance to movement of the line in both a casting and retrieving operation to the minimum, thus not only obtaining greater distance with less effort in a casting operation and reducing the wear on the line.

Other objects and advantages will appear in the description and drawings.

In the drawings, FIG. 1 is a side-elevational view of a rod having the present invention thereon.

FIG. 2 is an enlarged side-elevational view of one embodiment of the present invention thereon in a position preparatory to casting.

FIG. 3 is a top plan view of FIG. 2.

FIGS. 4, 5, 6 are fragmentary, semi-diagrammatic views illustrating substantially the relative positions of the critical portions of the present invention during a casting operation, and FIG. 5 shows one of the elements, which may hereafter be called an inertia means or member, at the point where it is released.

FIG. 7 is a side-elevational view of a modified form of the invention.

FIG. 8 is a top plan view of the device of FIG. 7.

FIG. 9 is an end view of the device of FIGS. 7 and 8.

In detail, a conventional fishing rod 1 is shown in FIG. 1 which rod includes the usual handle 2, reel 3, fishing line 4, and the guides or rings 5 secured to the rod at spaced points along the latter for guiding the line to the tip end of the rod. The rod is shown in a position preparatory to a casting operation.

The guide on the tip of the rod is part of the present invention, but it still may employ a socket member 8, and a ring 9 (FIG. 2). The socket member is adapted to receive the tip of the rod and to be secured thereon in the conventional manner, and the line 4 is adapted to extend through the ring 9 when the line is cast.

The tip-guide in the present case will be called the "propelling member," and is generally designated 10. Its function, apart from acting as a guide for the line, is to cooperate with another member or device that, in turn, is connected with the outer end of line 4 for propelling said latter member or device outwardly at the end of a casting movement of the rod. The member or device so propelled, is generally designated 11, and will be called the "inertia" means, member or element. As will later appear, this inertia means 11 performs the function of holding the line including any bait, hooks, lures or other accessories on the line, against outward movement until the casting movement substantially stops.

Ring 9 is rigidly secured between a pair of arms 13 at a point intermediate the inner and outer ends of said arms, and which arms extend divergently relative to each other in a direction outwardly of the socket member 8 and from opposite sides of the latter. The inner end portions of said arms are rigid with said socket member.

The words "outer," "outwardly," "inner" and "inwardly" are used with reference to the rod. Thus, the inner ends of arms 13 are the ends at the socket member and their outer ends are the ends projecting outwardly of the tip end of the rod.

As seen in FIG. 2, arms 13 are correspondingly inclined from socket member 8 to one side of the axis of rod 1, which is opposite to the side of the rod to which guide rings 5 project. The arms 13 continue outwardly beyond ring 9, as at 14, at a greater degree of divergence than that of the portions of arms 13 that extend between the ring 9 and the socket member.

An outer bar 15 extends between and connects the outer ends of arms 13, which bar is normal to the axis of rod 1, and is offset to the opposite side of rod 1 as the guides 5. This side to which bar 15 is offset may be called the "trailing side" since it is always the trailing side during a casting movement.

The bar 15 rotatably supports a cylindrical roller 16 thereon. Enlargements 17 may be on the ends of the roller, or between the ends of the roller 16 and the outer ends of arms 13, which enlargements preferably have tapered or rounded surfaces extending radially outwardly from the cylindrical ends of the roller.

The inertia means or member 11 may take various forms, some being shown in my copending application Serial No. 412,425, filed Nov. 9, 1964. The form illustrated is elongated and is circular in cross-sectional contour transversely of its longitudinal axis. When in position for use, its longitudinal axis is preferably slightly tilted relative to the axis of the rod 1, but it still extends generally longitudinally of the axis of said rod. Said member 11 has an inner end portion 18 that is adapted to extend relatively loosely into ring 9, and the body is enlarged at a point intermediate its ends, as at 19, to provide an axially facing shoulder that will abut the forward side of ring 9 when the line 4 draws the inner end portion 18 of the inertia member into ring 9, thus precluding passage of the inertia member through the ring 9. The inertia member also has an axially outwardly facing end surface 20, and a central forward projection 23 of substantially smaller diameter than the main body of the inertia member. When the inertia member is drawn over the leading side of the roller 16 (which is the upper side looking at FIG. 2) by reeling the line, the forward or outer end surface 20 will clear the roller just before the enlargement 19 engages the ring 9, and the forward end of the inertia member will then drop so that the projection 23 will rest on the roller 16, as seen in FIG. 2 and in FIG. 3. The rod will normally extend generally in the direction in which the line has been cast during reeling-in of the line, and whether in substanially the position shown in FIG. 2 or 3 the inertia element will nevertheless assume the relationship shown in FIGS. 2, 3 relative to the cylinder 16 upon the enlargement 19 engaging ring 9 at the end of the reeling-in step. The "pull" or drag on the cast line extending over roller 16 will tend to turn the rod to a position in which the roller is offset to the side of the rod that generally faces the direction in which the cast is made during the reeling-in step, and the opposite is true during the casting operation.

Extending centrally from the inner end of the inertia member 11 is a shank having an eye 24, or any other suitable means, for connection with the line 4. The outer projection 23 may also have an eye 25 for securing the hook carrying line 26 thereto. This latter line may have the usual hooks, sinker, lure, float, bait or other elements attached thereto.

The inertia member may be of metal, and relatively heavy, if it is desirable that it also function as a sinker, or it may be of floatable plastic, or hollow, if it is desirable to have it function as a float. Also, it is obvious that the inertia member may be in several pieces on a wire, such as shown in the aforesaid copending application, but in any event it should have the basic requirement of means for securing the fishing line and the hook line thereto, and structure for supporting it so that it will not pass through ring 9 and will include a portion that will engage the inner side of the roller 16 so that it will be held against separation from the propelling member until the end of the casting movement of the latter, after which it will be released for outward movement under centrifugal force.

FIG. 4 shows the basic elements of the propelling member and the inertia member at the commencement of a casting movement along arcuate line 28. The inertia member, in the position shown in FIG. 4, is held firmly against roller 16 due to centrifuged force and the drag of line 26 and also by the inertia of the member 11. In this position the drag by line 26 will hold the inner end portion 18 of the inertia member against the upper inner side of surface of ring 9.

In FIG. 5, the casting movement is substantially completed. This may be at any point in the arcuate swing of the rod, according to the desire of the fisherman, i.e., whether he wishes the lure, bait, etc. to follow a high or a flat trajectory.

When this casting movement stops, the inertia member will move in the direction of arrow 29 (FIG. 5) which substantially immediately is followed by complete release from the propelling member for movement in the direction of arrow 30 (FIG. 6) under the full force of the momentum or centrifuged force developed during the swing. The quick release of the inertia member is facilitated by use of the roller and by making the end surface 20 slightly convex.

The use of the roller also enables the inertia member to be made of plastic. There is a tendency of the plastic to become scored where its release involves frictionally sliding it across a stationary bar or surface.

This cannot occur where the roller is used. Were metal used for the portion of the inertia member that engages the roller, the latter might be eliminated, but release would involve frictional resistance not present where the roller is used.

As seen in FIG. 2, the member 23 may swivel about its axis if the head 32 thereof within the body of the inertia member and the portion extending through the outer end portion of the body are rotatable relative to the body, and the same may be true of the wire having the loop or eye 24 thereon. These eyes may, of course, be rigid with the body.

The inner end portion 18 of the inertia member has somewhat tapered sides so it will more readily move over the roller 16 and into ring 9 upon retrieving the inertia member and the line connected therewith after a cast has been made. When the inertia member is retrieved by reeling in the line, it will automatically reseat itself in the position shown in FIG. 1 for another cast.

It may be pointed out that the arms 13 may be outwardly bowed as indicated at 33 (FIG. 3) adjacent to the ring 9, and between said ring and the socket member 8 to insure against any interference with the inner end of any inertia element that would be used.

Also, the outer end of the socket member is preferably concavely curved in the plane of the portion of the arms 13 that are connected to the socket member, and convex in a direction at a right angle to said plane to insure a smooth engagement with the line 4 in the event of such engagement. The ring 9, of course, performs the double function of a guide for line 4 and a stop for the inertia member, both when the line 4 is reeled in and during a casting operation, although in the latter operation, the inner end 18 of the member 11 normally engages only one inner side of the ring.

Referring to FIGS. 7–9, the rod, reel, fishing line, and the line guides on the rod between the tip of the rod and the reel are the same as in FIGS. 1–6, so the same numbers used for describing FIGS. 1–6 will be used with respect to FIGS. 7–9.

The propelling member in FIGS. 7–9 is generally designated 34 and comprises a socket member 35 similar to socket member 8. A pair of arms 36 are secured at one of their ends to opposite sides of said socket member (FIGS. 8) and extend divergently relative to each other outwardly of the outer end of the latter.

Hereinafter the use of the words "upper" and "lower" and words of similar import are used with reference to the position of the rod and the device as shown in FIG. 7, which is generally the position of the rod and the device preparatory to casting the line.

An upper roller 37 is supported for rotation on a horizontally disposed shaft 38 that is spaced above the arms 36 at a point intermediate the forward and rear ends of said arms. Said roller 37 is rotatably supported in its elevated position on a horizontal shaft 38, that, in turn, is connected at its ends with the upper ends of a pair of posts 39. These posts extend upwardly from arms 36 and are rigid with said arms at their lower ends.

Arms 36 extend outwardly of the rod 1 past roller 37 and posts 39 and are connected at their spaced outer ends by a horizontal bar 40 that is parallel with shaft 38. A horizontal roller 41 is rotatable on rod bar 40. This roller 41 and its supporting means substantially corresponds to roller 16 and the mounting of the latter as seen in FIG. 3, except that the roller 41 and bar 40 may be shorter.

The arms 36 extend slantingly downwardly in a direction outwardly of the socket member 35 (FIG. 8).

The inertia means or member is generally designated 42 and is similar to the inertia member 11, except that the enlargement 19 of inertia member 11 may be omitted. Said inertia member 42 comprises a generally horizontally extending cylindrical body 43 having an outer end surface 45 that may be perpendicular to the axis of the body 43, and which end surface faces axially outwardly of the body and outwardly of rod 1, when the inertia member is supported on the propelling member (FIG. 7).

Body 43 is provided with an axially outwardly extending projection 46 at its inner end and a similar axially outwardly extending projection 47 at its outer end, said projections being substantially coaxial with the axis of body 43 and the outer ends of said projections, relative to body 43, are respectively provided with eyes 48, 49. The eye 48 provides means for securing the fishing line 4 thereto, while eye 47 provides means for connecting the hook, bait or lure line 26 (FIG. 7) thereto.

The eye 48 at the inner end of member 43 may in itself be the projection 46 and a wire 50 may rotatably extend through a central passageway 51 in body 43 (FIG. 7) to connect the eyes 46, 47, which wire is preferably slightly longer than the passageway 51 and body 43 so as to extend across the upper side of roller 41 in the same manner as projection 23 in FIG. 2 extends across roller 17, as will later be described more in detail. However, the structure employed for eyes 24, 25 of FIG. 2 may be used with respect to body 43.

A cross bar 54 extends horizontally between arms 36 below upper roller 37 and a pair of horizontally spaced arms 55 extend upwardly from said cross bar, and are rigidly connected therewith at their lower ends. These arms 55 are connected at their upper ends by an inverted U-bend 56 that extends across the forward or outer side of roller 37 centrally thereof and which bend may be curved rearwardly (FIG. 7) to substantially follow the curvature of the roller 37. The upper ends of arms 55 and the U-bend 56 are relatively close to the roller 37, but not in contact therewith.

Said arms 55 may be bent forwardly or provided with forwardly extending projections 57 between their lower and upper ends.

The vertical spacing between the cross bar 54 and the upper roller 37 is less than the diameter of the body 43, and line 4 is adapted to extend between roller 37 and cross bar 54, and between arms 55 when the line is connected with the eye 48 and the line is cast. Thus when the line 4 is retracted after a cast, bar 54 and roller 37 will prevent movement of the body 43 therepast in a direction toward the reel.

The spacing between the cross bar 54 and roller 41 may be approximately the length of body 43, but is such that, upon the rear end of the body 43 engaging the cross bar 54 and roller 37, the forward end will have cleared the roller 41 and said forward end will drop so that either the eye 49 or the portion of wire 50 adjacent thereto will rest on said roller 41 (FIG. 7). When tension on line 4 is released, the weight of the lure, sinker, or other means on the hook line will normally cause wire 50 to slide forwardly so that the portion of the wire adjoining eye 49 will rest on roller 41.

The spacing between arms 55 and projections 57 thereon is such as to substantially center the body 43 between arms 36, and the projections 57 may extend slightly divergently relative to each other in a direction toward roller 41 so as to guide the body 43 to a centered position between arms 36.

When the body 43 is supported by cross bar 54 and roller 41, as described, it slants downwardly in a forward direction and is in a position preparatory to making a cast.

The casting operation is the same as shown in FIGS. 4–5, insofar as roller 41 is concerned, but it will be noted that when the cast is completed, the roller 37 is lowermost, and the line 4 will be supported on said roller thereafter including the time when the fish is being "played" and the line is reeled in, thus reducing any friction on the line at the tip of the rod to a minimum.

The inertia member will automatically reseat itself as shown in FIG. 7 upon the rod being again moved to a casting position.

The arms 55 that are between rollers 41 and 37 function not only as a guide for the line 4 when the latter is being reeled in, but it functions as a guide for the inertia member.

Insofar as the inertia member is concerned, it may assume various forms, and need not be a unitary element, as long as it cannot pass the stop provided, in this instance, by the roller 37 and cross bar 54, and is provided with means for holding it against outward movement against roller 41 until end of the casting movement of the rod, and at which time it will be released substantially as described relative to FIGS. 4–6.

One important feature of the present type of device is the same as in my copending application; namely, there is no tension whatsoever on the fishing line during the casting movement prior to the release of the inertia member. Heretofore the entire length of the line between the lure, etc., and the reel takes the strain resulting from the inertia developed during the casting movement, which strain in some instances is sufficient to break the line. It accordingly follows that with the present type of invention a lighter line may be used than heretofore.

It is pertinent to note that the inner end of the inertia member extending into ring 9 or into the space between roller 37 and cross bar 54 has relatively small clearance so that the outer end of the inertia member will immediately swing free of roller 16 or 41 at the end of the casting movement.

While I have illustrated and described a preferred embodiment of my invention, it will be understood that various changes may be made without departing from the spirit and scope of the invention as set forth in the appended claims.

I claim:
1. A fishing device for use in casting a fishing line from a rod having a handle at one end and a reel adjacent thereto for a fishing line and a tip at its opposite end, comprising:
 (a) an inertia member adapted to be secured to the outer end of such line;
 (b) a propelling member having an inner end including rod-securing means for securing said inner end to the tip of such rod, and an outer end opposite to and spaced from said inner end;
 (c) supporting means on said propelling member for releasably supporting said inertia member thereon in a position between said inner end and said outer end of said propelling member, said supporting means including an element extending across the surface of said inertia member that is remote from said inner end for holding said inertia member against separation from said propelling member under the influence of centrifugal force during swinging of said tip of said rod in a casting movement when said rod securing means is secured to said tip;
 (d) said supporting means and said propelling member and said inertia member being free from obstruction to movement of said inertia member out of engagement with said supporting means under the influence of inertia developed in said swinging of said tip for free casting of said inertia means under the influence of centrifugal force at the end of said swinging, when said rod securing means is secured to said tip and said inertia member is in said position on said propelling member during said swinging of said tip;
 (e) means on said propelling member supporting said element for rotation to facilitate movement of said inertia member to a position free from said propelling member for said casting thereof.

2. In a device as defined in claim 1:
 (f) line securing means on the end of said inertia member that is opposite to said element and adjacent to said inner end of said propelling member when said inertia member is in said position on said supporting means for securing such fishing line thereto;
 (g) said supporting means including stop means for engaging said inertia member when the latter is in said position on said supporting means for restricting movement of said inertia member in a direction toward said inner end of said propelling member.

3. A casting device for a fishing rod, comprising:
(a) an elongated propelling member having an inner end and an outer end and including a socket portion at said inner end for receiving the tip of such rod and for securement to said tip for supporting said propelling member on said rod in a position extending generally longitudinally of said rod with said outer end spaced axially outwardly of said rod and tip;
(b) an element on said outer end extending transversely of said propelling member;
(c) a guide on said propelling member spaced from said element having a passageway therethrough directed generally toward said outer end;
(d) an inertia member separable from said propelling member having two opposite ends and including a first means at one of said two ends releasably extending into said passageway and a second means at said opposite end extending over said element for supporting said inertia means in a position extending between said passageway and said element when said propelling member is generally horizontally disposed;
(e) said opposite end of said inertia member having a shoulder facing axially outwardly of said inertia member relative to an axis extending through said first and said second means for engaging said element to preclude separation of said inertia means from said propelling member in a direction axially of said axis;
(f) means carried by said inertia member adjacent to said first means for swinging one end of a fishing line thereto; and
(g) means adjacent to said second means for securing a hook line thereto;
(h) said propelling member including a pair of spaced arms secured at one of their ends to said socket portion and said element extending between and rotatably supported by said arms at the ends thereof that are remote from said socket portion;
(i) said guide being an annular member secured to and between the ends of said arms that are adjacent to said socket portion.

4. In combination with a fishing rod having a handle at one end; a reel adjacent to said handle having a fishing line thereon, and a tip at the end of said rod opposite to said handle:
(a) an elongated propelling member having an inner end and an outer end and secured on said tip at its inner end in a position extending generally longitudinally of said rod and projecting axially outwardly of said tip;
(b) an element on said outer end of said propelling member extending transversely of said rod;
(c) a guide on said propelling member spaced from said element having a passageway therethrough directed generally toward said element;
(d) an inertia member separable from said propelling member having two opposite ends and including a first means at one of said two ends releasably supported by said guide and second means at said opposite end extending over said element for supporting said inertia element in a position extending between said guide and said element when said rod is generally horizontally extending preparatory to casting said line;
(e) said opposite end of said inertia member having a shoulder facing axially outwardly of said rod substantially in engagement with said element precluding separation of said inertia member from said propelling member during a casting swing of said rod and the consequent inertia developed in said inertia member;
(f) said fishing line being connected to said inertia member at the end of the latter adjacent to said first means;
(g) said propelling member and said inertia member being free from obstruction to movement of said inertia member out of engagement with said element under the influence of inertia developed during said casting swing of said rod at the end of said swing for free casting of said inertia means outwardly of said rod under the influence of centrifugal force;
(h) said element being a roller supported for rotation about an axis extending generally perpendicular to the axis of said rod.

5. A fishing device for use in casting a fishing line from a rod having a handle at one end and a reel adjacent thereto for a fishing line, and a tip at its opposite end comprising:
(a) an inertia member adapted to be secured to the outer end of such line;
(b) a propelling member having an inner end including rod securing means for securing said inner end to the tip of such rod, and an outer end opposite to and spaced from said inner end;
(c) a pair of elements rotatably supported on said propelling member between which said fishing line is adapted to extend;
(d) supporting means on said propelling member for releasably supporting said inertia member thereon in a position between said inner end and said outer end including one of said elements of said pair in a position extending across the surface of said inertia member that faces outwardly of said inner end for holding said inertia member against separation from said propelling member under the influence of centrifugal force during swinging of said tip of said rod in a casting operation when said propelling member is secured on the tip of said rod, and over and above one side of which said line is adapted to move when said inertia member is supported on said supporting means, at the beginning of a casting movement thereof;
(e) the other element of said pair being in a position for engagement with the said line upon inversion of said propelling member at the end of a casting movement and upon the cast line being retrieved by such reel.

6. A fishing device comprising:
(a) an inertia member having a main body and an inner and outer projection at opposite ends thereof projecting oppositely outwardly of said inner and outer ends respectively, one projection being adapted for securement of a fishing line thereto and the other projection being adapted for securement of a hookline and the like thereto;
(b) an elongated propelling member having spaced opposite ends and an inner element and an outer element spaced apart longitudinally of said propelling member for supporting said body therebetween with said projections in positions over said elements when said propelling member is in a generally horizontal position preparatory to casting said inertia member, and which inertia member is releasable from said propelling member under the influence of momentum and centrifugal force upon swinging said propelling member in an arc upwardly and laterally from said horizontally extending position with said elements behind said projections and then ceasing such movement;
(c) said outer element being in engagement with said outer end of said inertia element during such casting movement and being rotatable for rotation by said inertia member upon said inertia member being released from engagement with said outer element at the end of said casting movement.

7. In a device as defined in claim 6:
   (d) means on said inner projection for connecting a fishing line thereto;
   (e) a member rotatably supported on said propelling member above said inner element when said propelling member and inertia member are in said generally horizontal position for engagement with such line after said inertia member has been released from said propelling member at the end of said casting movement.

References Cited by the Examiner

UNITED STATES PATENTS

| | | | |
|---|---|---|---|
| 1,226,162 | 5/1917 | Attula | 43—19 |
| 2,381,089 | 8/1945 | Tweit | 43—19 |
| 2,709,315 | 5/1955 | Walter | 43—24 |

SAMUEL KOREN, *Primary Examiner.*

WARNER H. CAMP, *Examiner.*